United States Patent Office 3,756,802
Patented Sept. 4, 1973

---

3,756,802
METHOD OF DEFOLIATING PLANTS
Ernst Beriger, Allschwil, Switzerland, assignor to Ciba-Geigy AG, Basel, Switzerland
No Drawing. Continuation-in-part of abandoned application Ser. No. 668,164, Sept. 15, 1967. This application Dec. 30, 1970, Ser. No. 103,009
Claims priority, application Switzerland, Sept. 20, 1966, 13,572
Int. Cl. A01n 9/36
U.S. Cl. 71—71                                   6 Claims

ABSTRACT OF THE DISCLOSURE

A method of defoliating plants, especially cotton plants, is disclosed, which comprises applying to said plants a compound of the formula

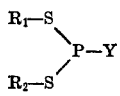

wherein $R_1$ and $R_2$ each represents an alkyl group containing up to 6 carbon atoms and Y stands for halogen.

CROSS REFERENCE

This application is a continuation-in-part of application Ser. No. 668,164 filed Sept. 15, 1967, now abandoned.

DETAILED DISCLOSURE

The present invention provides a method of defoliating plants which comprises applying to said plants an effective amount of a compound of the formula

(I)

wherein $R_1$ and $R_2$ each represents an alkyl radical containing up to 6 carbon atoms and Y stands for halogen.

The alkyl radicals coming into consideration may be branched or unbranched. Exemplary of such radicals are methyl, ethyl, propyl, iso-propyl, butyl, iso-butyl, sec. or tert.butyl, n-pentyl or n-hexyl. Suitable halogens are fluorine, chlorine, bromine and iodine. Especially suitable compounds, however, correspond to the formula

(II)

wherein $R_3$ and $R_4$, each represents a branched or unbranched alkyl radical containing 3 to 4 carbon atoms and X stands for chlorine.

There may be mentioned as examples of alkyl radicals of the preferred embodiment: n-propyl, iso-propyl, n-butyl, sec. and tert.butyl.

The compounds of the Formula I have a pronounced defoliating and desiccating activity. They can be used for defoliating a series of plants, especially, however, for defoliating cotton plants. The defoliation may be accompanied simultaneously by a promotion of the ripening. Thus it is possible to successfully treat tomato, potato, or soybean plants.

The application of the compounds of the Formula I may be carried out according to commonly used methods. Thus the active ingredients may be applied per se, i.e. without any additives, or in the form of preparations, i.e. together with additives. Suitable additives may be liquid or solid and correspond to the additives commonly used in the formulation technique. Examples of such additives are natural or regenerated mineral substances, solvents, diluents, dispersing agents, wetting agents, adhesives, thickeners or fertilizers. There may also be added other herbicides or defoliating agents which are in themselves known. As a rule the preparations contain 0.1 to 95% of active ingredient. But, especially when the ultra-low volume technique is applied, the content of active ingredient may be as high as 99.5 to 100%.

In order to manufacture solutions of compounds of the general Formula I for direct spraying there may be used, for example, petroleum fractions in the high to medium boiling range, for example, diesel oil or kerosene, coal tar oil or oils of vegetable or animal origin, also hydrocarbons, for example, alkylated naphthalenes, tetrahydronaphthalene, if desired, with the use of xylene mixtures, cyclohexanols, ketones, furthermore chlorinated hydrocarbons, for example, trichlorethane, tetrachlorethane, trichlorethylene or tri- or tetrachlorobenzenes It is advantageous to use organic solvents that boil above 100° C.

It is especially advantageous to manufacture aqueous preparations from emulsion concentrates, pastes or wettable powders, by the addition of water. Suitable dispersants are nonionic products, for example, condensation products of ethylene oxide with aliphatic alcohols, amides or carboxylic acids containing a long-chain hydrocarbon residue having about 10 to 20 carbon atoms, for example, the condensation product of octadecyl alcohol with 25 to 30 mols of ethylene oxide, or of soybean fatty acid with 30 mols of ethylene oxide, or of commercial oleylamine with 15 mols of ethylene oxide or of dodecylmercaptan with 12 mols of ethylene oxide. Amongst the suitable anionic emulsifiers, there may be mentioned especially the sodium salt of dodecylalcohol sulphuric acid ester, the sodium salt of dodecylbenzenesulphonic acid, the potassium or triethanolamine salt of oleic acid or of abietic acid or of mixtures of these two acids, or the sodium salt of a petroleumsulphonic acid. Suitable cationic dispersants are quaternary ammonium compounds, for example, cetyl pyridinium bromide and dihydroxyethyl benzyl dodecyl ammonium chloride.

Solid vehicles that may be used for the manufacture of dusting and casting preparations are: talcum, kaolin, bentonite, calcium carbonate or calcium phosphate, coal, cork meal, wood meal or other materials of vegetable origin. It is also very advantageous to manufacture the preparations in granulated form. The various forms of application may contain the conventional additives that improve the dispersion, the adhesion, the stability towards rain or the penetration; such substances are fatty acids, resins, glues, casein and alginates.

When a preparation containing a phosphite of the Formula I is used for defoliating cotton, tomatoes, beans or the like, it is mainly used in the form of a solution. Suitable solvents are paraffin fractions boiling within the range of from 120 to 160° C. Such defoliating preparations may further contain known defoliants, for example, trialkylthiophosphites or alkylpolysulphides.

Further suitable solvents are alcohols, for example, ethanol, isopropanol or butanol, chlorinated hydrocarbons, ketones, for example, acetone, methylethylketone, methylisobutylketone, also dimethylformamide and cyclohexane. Solutions obtained in this manner may be applied as such or dispersed in an aqueous system, and then sprayed over the plants.

The active substances of the Formula I are dithiophosphites.

Some of the active substances have already been described in the literature and the others can be prepared by the known processes described below.

As a rule, the active substances of the Formula I are obtained by reacting a trihalide of the formula

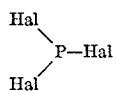
(III)

wherein Hal represents chlorine or bromine- with a suitable thiol; advantageously, the reaction is slowed down sufficiently to ensure that the third halogen atom is not exchanged.

Example 1

2750 parts by weight of phosphorus trichloride are introduced into a 4 neck flask equipped with dropping funnel, agitator, thermometer and brine cooler. While stirring vigorously, 1800 parts by weight of butanethiol are added drop by drop during 3 hours, while maintaining the temperature at about 25 to 35° C. The whole is then kept overnight and then stirred and heated at a temperature from 60 to 70° C. for approximately 3 hours. While stirring vigorously, the excess of phosphorus trichloride and the resulting, still dissolved hydrochloric acid are expelled under vacuum. The whole is then distilled under vacuum, to yield the phosphite of the formula $(n)C_4H_9S$
$\phantom{xxx}\diagdown$
$\phantom{xxxxx}P-Cl$
$\phantom{xxx}\diagup$
$(n)C_4H_9S$ (Compound No. 1)

which boils at 108–122° C., under 0.05 mm. Hg pressure.

This phosphite is an especially potent defoliant for cotton.

Example 2

(a) When the under-mentioned mercaptans are reacted with phosphorus trichloride as described in Example 1, they yield the phosphorus compounds listed below.

| Compound number | Mercaptan | Phosphite | Boiling At °C. | Under mm. Hg |
|---|---|---|---|---|
| 2 | Sec. butylmercaptan | (sec. $C_4H_9S)_2P-Cl$ | 90–92 | 0.1 |
| 3 | Propylmercaptan | $(C_3H_7S)_2P-Cl$ | 98–102 | 0.5 |

Example 3

A stock solution of an emulsifier (I) is prepared, for example of sorbitan polyhydroxyethylene stearate, by dissolving 100 g. of (I) in 1 liter of acetone. One gram of active ingredient is dissolved in 10 ml. of the stock solution and diluted with 190 ml. of water to form a solution containing 0.5% of active substance.

*Test:* Three months old cotton plants were sprayed with the test liquor. The amount of active ingredient corresponded to 2 and 4 kg./hectare respectively. Evaluation of the defoliating effect took place seven days later.

| Compound number | Defoliating effect with— | |
|---|---|---|
| | 2 kg./ha. | 4 kg./ha. |
| 1 | 4 | 3 |
| 2 | 5 | 3½ |
| 3 | 5 | 3½ |

What is claimed is:

1. A method of defoliating plants which comprises applying to the said plants a compound of the formula

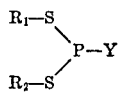

wherein $R_1$ and $R_2$ each represents an alkyl radical containing up to 6 carbon atoms and Y stands for halogen.

2. A method according to claim 1 which comprises applying to the said plants a compound of the formula

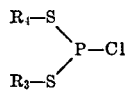

wherein $R_3$ and $R_4$ each represents a branched or unbranched alkyl radical containing 3 to 4 carbon atoms.

3. A method according to claim 2 which comprises defoliating cotton plants.

4. A method according to claim 2 which comprises applying to the said plants the compound of the formula

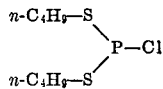

5. A method according to claim 3 which comprises applying to the cotton plants the compound of the formula

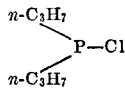

6. A method according to claim 3 which comprises applying to the cotton plants the compound of the formula

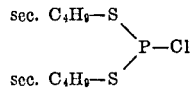

References Cited

UNITED STATES PATENTS 2,836,534    5/1958    Birum _____ 71—87
3,193,372    7/1965    Regel _____ 71—71

JAMES O. THOMAS, JR., *Primary Examiner*

U.S. Cl. X.R.

71—72, 87